United States Patent [19]
Yeh

[11] Patent Number: 5,347,164
[45] Date of Patent: Sep. 13, 1994

[54] UNINTERRUPTIBLE POWER SUPPLY HAVING A 115V OR 230V SELECTABLE AC OUTPUT AND POWER SAVING

[75] Inventor: Wen-Jen Yeh, Hsinchu, Taiwan

[73] Assignee: Accton Technology Corporation, Hsinchu, Taiwan

[21] Appl. No.: 957,965

[22] Filed: Oct. 8, 1992

[51] Int. Cl.$^5$ .............................................. H02J 9/00
[52] U.S. Cl. ......................................... 307/66; 307/64
[58] Field of Search ............................. 307/64, 65, 66

[56] References Cited

U.S. PATENT DOCUMENTS

| | | | |
|---|---|---|---|
| 4,384,214 | 5/1983 | Crick et al. | 307/66 |
| 4,528,459 | 7/1985 | Wiegel | 307/66 |
| 4,560,886 | 12/1985 | Ferguson | 307/64 |
| 4,860,185 | 8/1989 | Brewer et al. | 307/66 |

Primary Examiner—Jeffrey A. Gaffin
Attorney, Agent, or Firm—Lowe, Price, LeBlanc & Becker

[57] ABSTRACT

A method and apparatus is described for providing uninterrupted DC and selectable AC power depending on the value of utility-supplied AC voltage range. In the AC 115 V output case, by means of setting a selecting switch and switching a relay port, the DC/AC inverter will function as a half bridge switching circuit upon power failure and use the mid-point of series connected filtering capacitors as a relative ground reference point, to provide an AC 115 V output; in the AC 230 V output case, by means of different setting of the selecting switch and switching a relay port, a DC/AC inverter will function in a full bridge circuit upon power failure and use the full voltage of the series connected filtering capacitors, to provide an AC 230 V output. The power source of the control circuit in the backup portion is interlocked and sequentially controlled for the purpose of power saving.

3 Claims, 10 Drawing Sheets

1

UNINTERRUPTIBLE POWER SUPPLY HAVING A 115V OR 230V SELECTABLE AC OUTPUT AND POWER SAVING

BACKGROUND OF THE INVENTION

1. Field of the Invention

The present invention relates to an uninterruptible power supply, in particular, to a 115 V or 230 V AC output selectable, power saving, uninterruptible power supply.

2. Description of the Prior Art

As disclosed in FIG. 1, a conventional uninterruptible power supply system has an uninterruptible power system and a switching power supply integrated into one unit, wherein a battery power source is converted into an AC power source to supply, a computer monitor display and the like. However, owing to a linear transformer is employed for a direct boost convertion, this type of an uninterruptible power supply is large and heavy, such that it is not readily installed in a mini-size power supply. In particular, the AC output has no stable voltage and is unable to be switched into a 115 V or 230 V backup power source. As a result, two separate circuits are required. Therefore, the conventional uninterruptible power supply has an advantage of simple circuitry, but has disadvantages of big in size, heavy in weight and not capable of selecting a 115 V or 230 V AC output.

SUMMARY OF THE INVENTION

In view of the aforementioned disadvantages of the conventional uninterruptible power supply, a main object of the present invention is to provide an uninterruptible power supply having a DC backup outlet and a selectable, uninterruptible 115 V or 230 V AC output voltage for AC load. Besides, after a battery is installed, it has no consumption of the battery power during storage, transportation or other conditions when it is not power on. It is then available for use without recharging after unpacked.

The invention is to provide a DC backup output and a 115 V or 230 V AC output selectable, power saving, uninterrupted power supplier where (in the AC inverter part) uses a half bridge circuit structure when the output is selected by a switch at 115 V AC backup power output, it connected to the half voltage node of the serial filtering capacitors of an AC input voltage doubler rectifier circuit as a relative ground voltage node for a 115 V AC output; on the other hand, when the output is selected by the same switch said above at a 230 V AC backup power output, it employs a full bridge circuit structure and connected to the full voltage node of the serial filtering capacitors.

A more complete understanding of the features and advantages of the invention will become more apparent from the following description taken in conjunction with the accompanying drawings.

DESCRIPTION OF THE PREFERRED EMBODIMENTS

Figure 1:
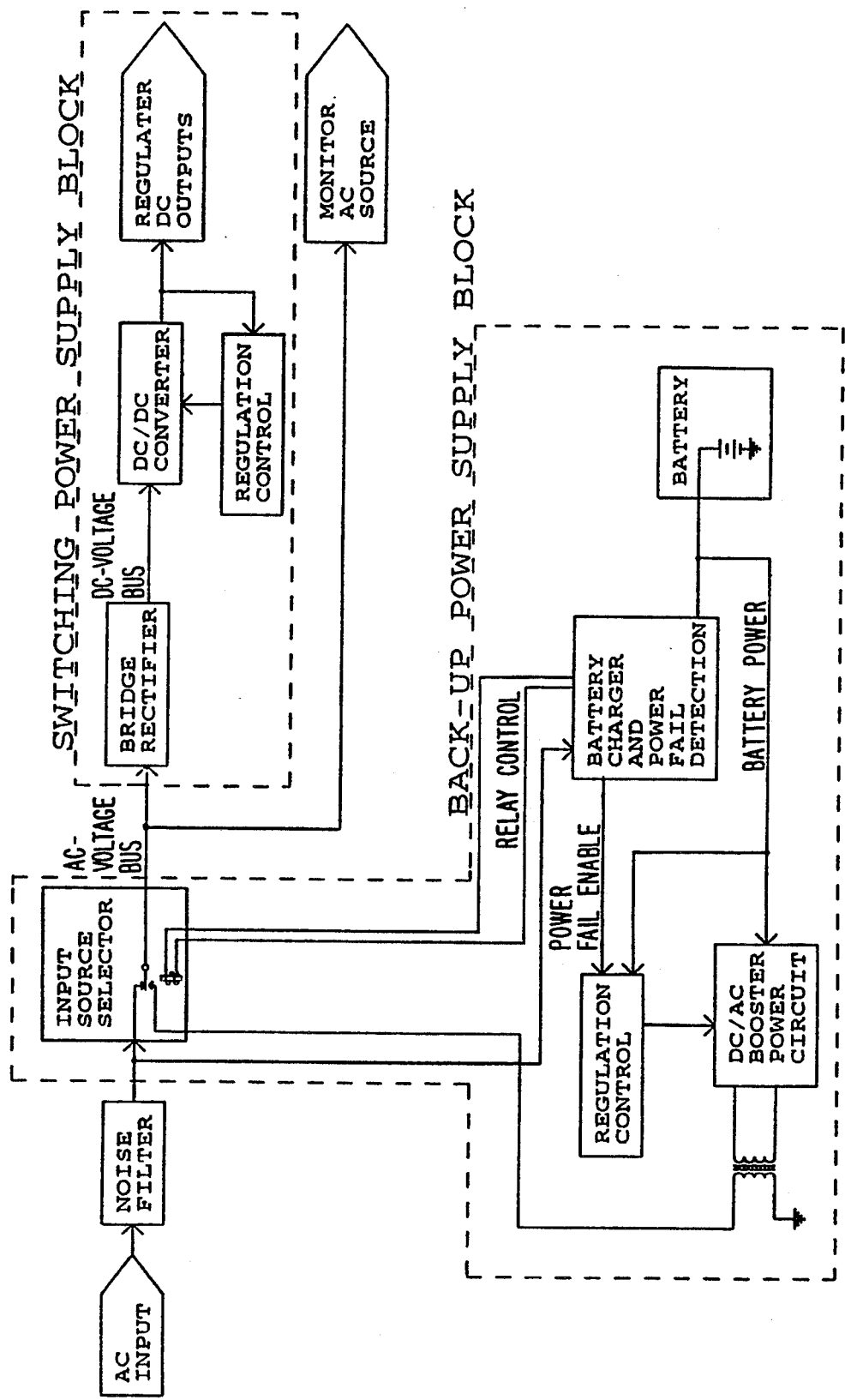
FIG. 1 is a systematic block diagram of a conventional uninterruptible power supply.
Figure 2:
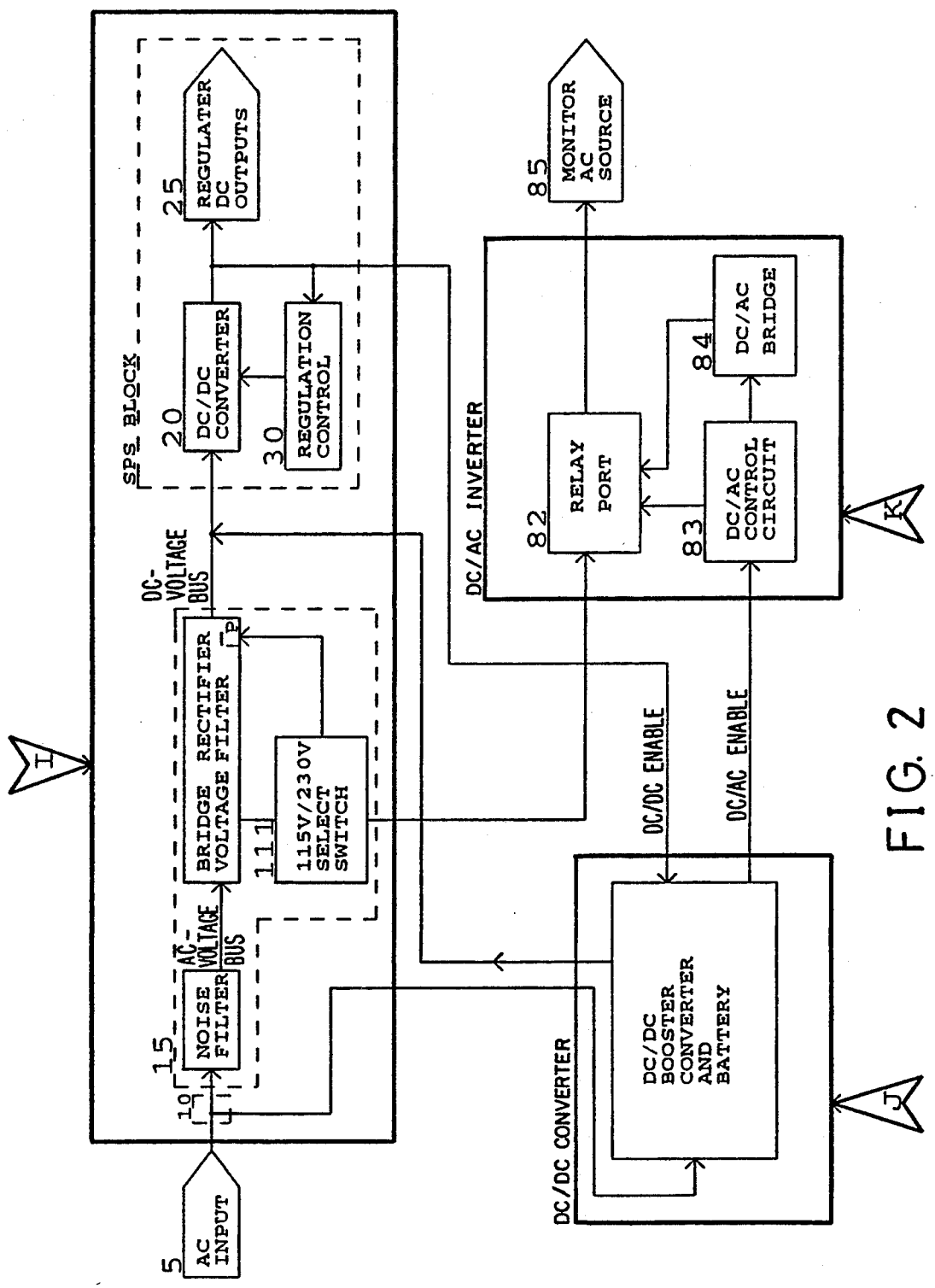
FIG. 2 is a systematic block diagram of the uninterruptible power supply of the present invention.
Figure 3:
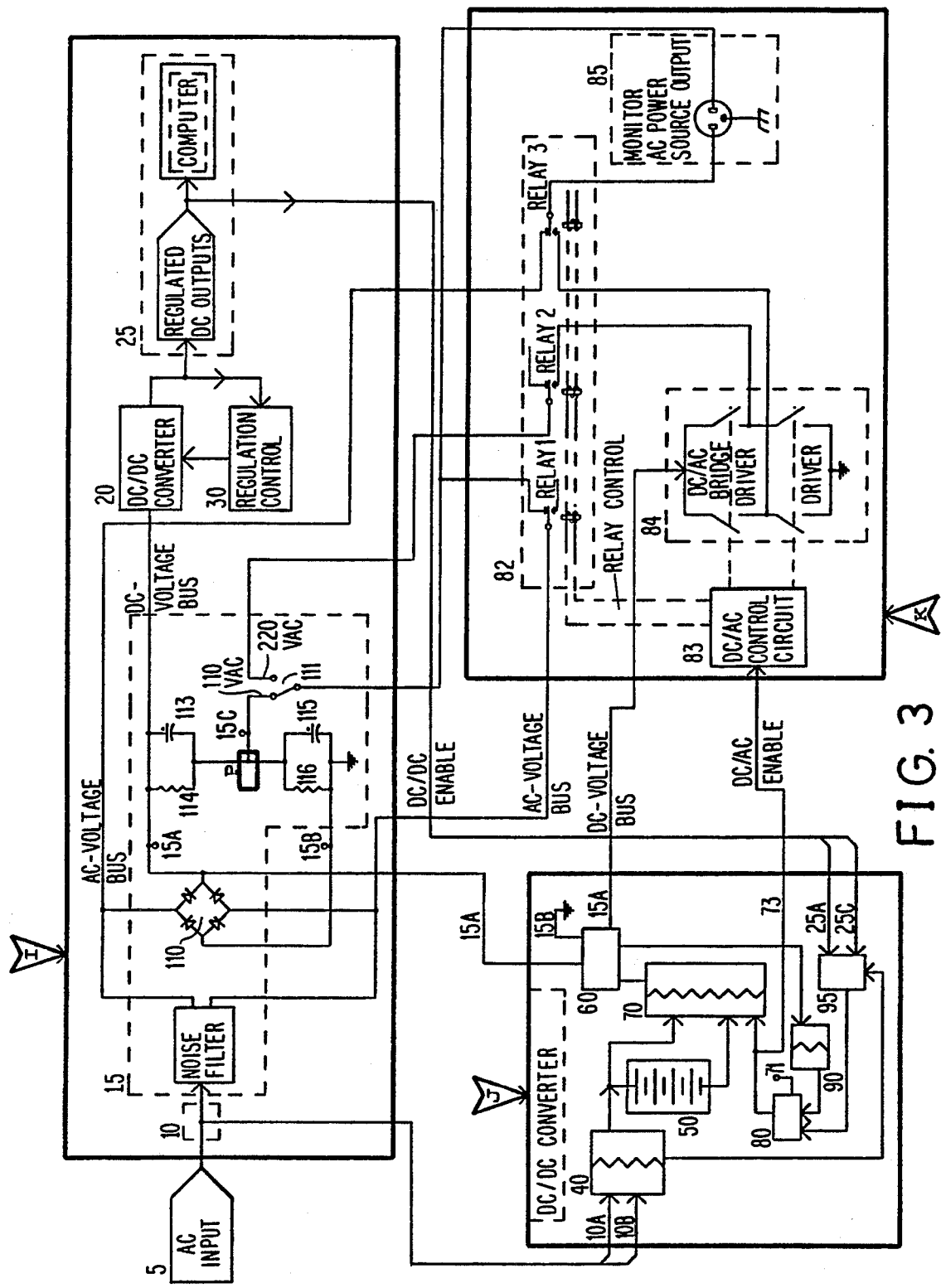
FIG. 3 is a block diagram of the entire connection circuit of the present invention.

FIG. 2 is a system block diagram of the uninterruptible power supply of the present invention, and FIG. 3 is a circuit diagram of the embodiment of FIG. 2. It is clearly shown that the systematic construction of the present invention comprising:

a first device 15, which is composed of a noise filter, a bridge rectifier and the serial filtering capacitors and a 115 V/230 V selecting switch in combination for carrying out the procedures, such as input, filter, rectification and selecting switch, wherein the noise filter connects to an utility AC input 5 and transmits the filtered voltage, via an AC voltage bus, to the bridge rectifier and the serial filtering capacitors to be rectified into a DC voltage output, and the 115 V/230 V selecting switch which serves two purposes, while AC utility power available, it can be used to select different input voltage range, while AC utility power not available it can be used to setting different backup AC output voltage according to the input voltage range.

- a second device, composed of a DC/DC booster converter and a battery in combination, wherein the DC/DC booster converter converts the battery power to a 300 V DC power and possesses functions of charging the battery and detecting utility power failure; additionally, the output thereof connects to a DC voltage bus connected by the serial filtering serial capacitors of the said first device 15;
- a third device, composed of a DC/DC step-down converter 20, regulator DC outputs 25 and a regulation control 30 in combination, wherein the DC/DC step-down converter 20 connects to the serial filtering capacitors of the first device 15 via a DC voltage bus, and serves as a drive circuit and an insulation voltage drop circuit of the switching power supply; the regulator DC outputs 25 are used in filtering to give a smooth DC power source; the regulation control 30 then is consisted of a PWM (Pulse Width Modulation) controller and an OVP (Over Voltage Protect) circuit; and said third device is a DC/DC step-down converter for converting a high voltage DC to a low voltage DC power source, and provides power saving benefits by the DC/DC step-down converter enable circuit installed between it and the second device;

a fourth device 83, being a DC/AC inverter control circuit, is connected to said second device by a DC/AC inverter enable cable thereby it is enabled;

a fifth device 82, being a relay port and comprising an isolation relay, a full bridge switching relay and an utility power/backup power switching relay connected to the first device 15 and the fourth device 83 and the sixth device 84, respectively to decide whether 115 VAC, or 230 VAC will be functioning to a AC source 85;

a sixth device 84, being a DC/AC bridge converter, is driven by the fourth device 83 and results in an alteration of the connection node of the fifth device 82;

by means of the aforementioned devices, while the utility power is normal, a DC reglated voltage is supplied from the third device to the load; while the utility power fails, a backup battery power is converted to a DC high voltage by the second device and then sent to the first device therefrom it continues to supply for the third device to be output to the DC load; also, by means of the fourth, fifth and sixth devices and by setting the selecting switch in the first device, an AC power source is supplied for external AC loads at device 85.

Moreover, as shown in FIG. 2 and FIG. 3, the first device and the third device in the system of the invention may together form a switching power supply, that is, portion "I" in the figures. The DC/DC booster converter and the battery in the second device actually form a DC/DC converter, that is, portion "J" in the figures. As to the fourth, fifth and sixth devices 83, 82 and 84, they together form a DC/AC inverter that is, portion K in the figures. A classification like this is not only practical, but also is convenient in understanding and illustrating the following embodiments.

Figure 4:
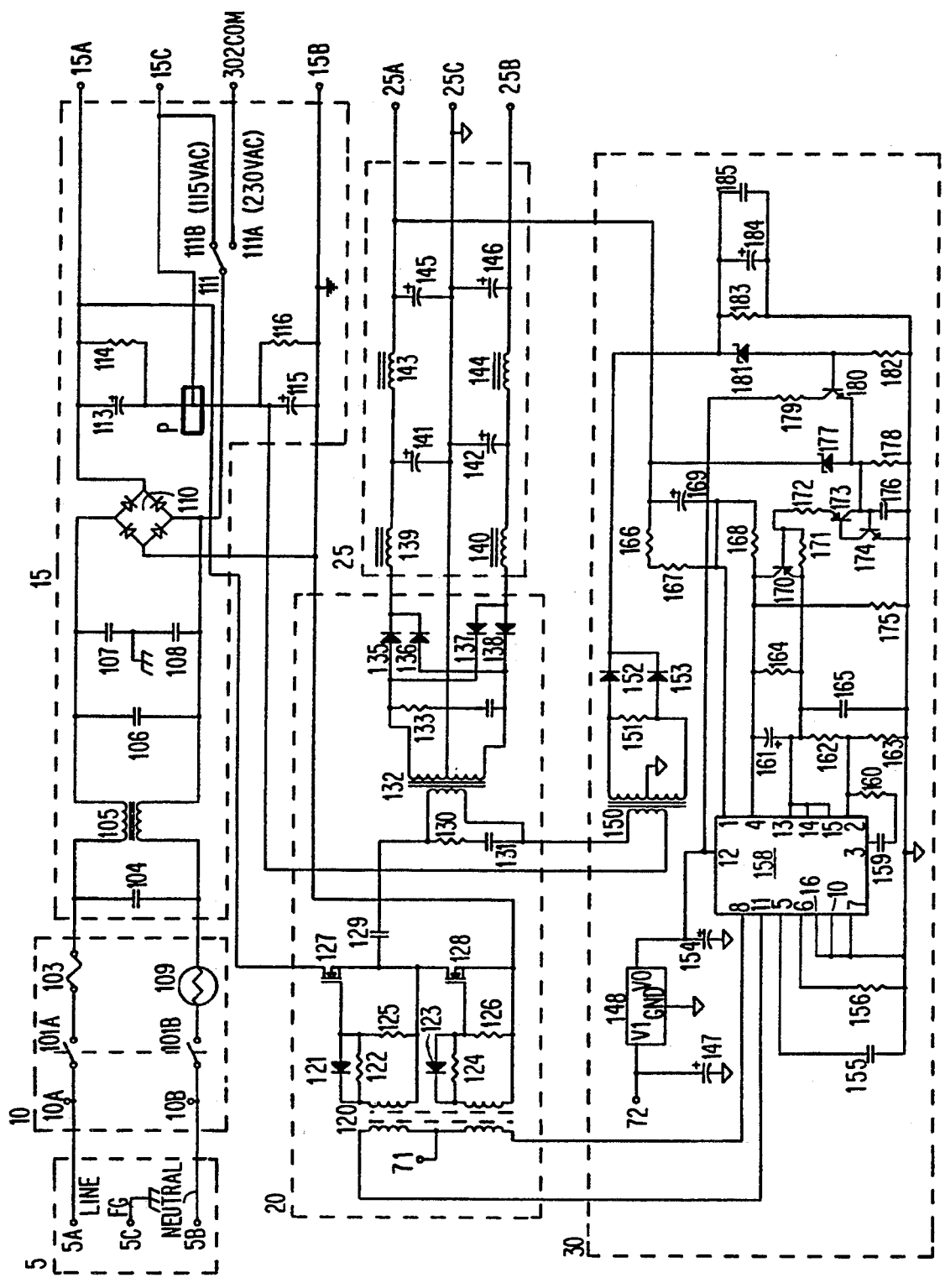
FIG. 4 is an embodied circuit diagram of the portion "I", that is, a step-down switching power supply.

Referring to FIG. 4, the portion "I" in the system of the invention is an embodiment of a switching power supply. In fact, this portion includes the first and the third devices of the system of the invention, wherein:

an AC input 5 is an utility power input node, in which 5A indicates line input, 5B indicates neutral input, and 5C indicates frame ground input;

a power switch 10 sends the utility power of the AC input 5 to the first device 15, and the circuit thereof consists of a fuse 103 and a thermistor 109 for suppressing an instantaneous surge current while switch ON;

capacitors 104, 106, 107, 108 and inductor 105 together form a noise filter it is used to filter off the noise generated by a switching power supply;

a bridge rectifier 110, the serial filtering capacitors 113, 115 and discharge resistors 114, 116 form a bridge rectifier voltage filter, which, matching with a selecting switch 111 wherein, on a 115 V utility AC input, a bridge rectifier 110 operates in the manner of voltage doubler rectification, the connection node of the selecting switch 111 switches to 111COM and 111B and then to 15C, i.e., node P; on a 230 V utility AC input, the bridge rectifier 110 operates in a manner of a full bridge, full wave rectification, and the connection node of the selecting switch 111 switches to 111COM and 111A, and then to the connection node 302COM of the relay 302 in the fifth device 82.

A DC/DC step-down converter 20 is used as a driving circuit and an insulation voltage drop circuit of the switching power supply, wherein it includes a pulse transformer 120; while resistors 130, 133 and capacitors 131, 134 respectively construct two sets of snubber to absorb spike wave.

Regulator DC outputs 25 are used for filtering. Inductors 139, 140 and capacitors 141, 142 composed the first stage filtering, and inductors 143, 144 and capacitors 145, 146 composed the second stage filtering in order to output a smooth DC power source. Output ports 25A, 25B and 25C act to output a positive and a negative power source and act as a common reference ground voltage node, respectively.

A regulation control 30 comprises an IC 158 PWM controlled a capacitor 155 and a resistor 156 are used to control the operation frequency of the IC 158; a capacitor 159 and a resistor 160 are used to control the phase compensation of the feedback; a capacitor 162 and resistors 164, 175 compose a soft start circuit for starting the switching power supply more smoothly; resistors 166, 167, 168 and a capacitor 169 together form DC output feedback voltage stabilizing circuit and the latter is connected to an output port 25A of regulator DC outputs 25; additionally, a zener diode 177, resistors 171, 172, 178, a capacitor 176 and transistors 170, 173, 174 together form an Over Voltage Protect circuit (O.V.P.).

Figure 5:
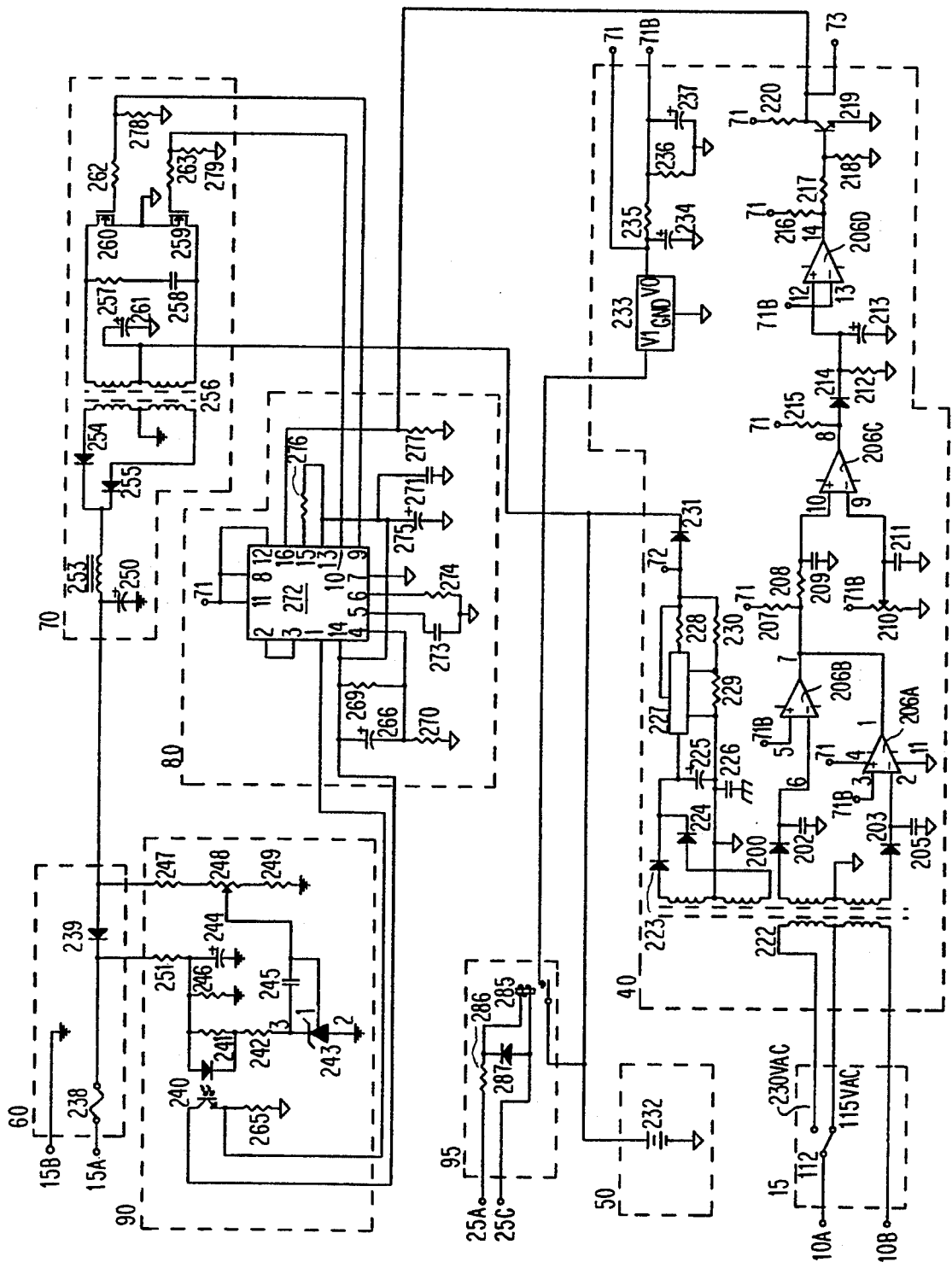
FIG. 5 is an embodied circuit diagram of the portion "J", that is, a DC/DC booster converter.

FIG. 5 is an embodied circuit diagram of the portion "J", i.e., the second device of the system of the invention which actually contains a DC/DC booster converter, wherein it comprising:

a selecting switch 112 interlocked with the selecting switch 111 of the first device 15 for selecting 115 V or 230 V;

a circuit 40 consists of a battery charging, utility AC fail determination and a +12 V bias power source, which has an input terminal connected to the select switch 112 for inputting a 115 V or 230 V utility AC voltage;

a battery 50 connected to the above said circuit 40;

a power saving apparatus 95 composes of a current-limiting resistor 286, a diode 287 and a relay switch 285, which is driven by regulator DC outputs 25 in the third device and is used to make sure that the battery back-up power can be initiated only if the regulator DC output 25 has presented first, otherwise it will not be initiated; which also serves to prevent effectiveless battery power from being consumed by the control circuit in devices 40 and 83 during the transportation or storage for the purpose of achieving power saving;

a PWM control apparatus 80, including PWM IC 272, soft start circuits composes with a capacitor 266, and resistor 269, 270, oscillator composes with a capacitor 273, a resistor 274 and both capacitors 271 and 275;

a low voltage/high voltage converter 70, which may convert the voltage from the battery 50 to a +300 V DC voltage;

a +300 V DC high voltage connection node 60 for outputting the DC power source from this DC/DC booster converter; and an insulation feedback control circuit 90, wherein a photo couple 240 is used for insulation.

Figure 6:
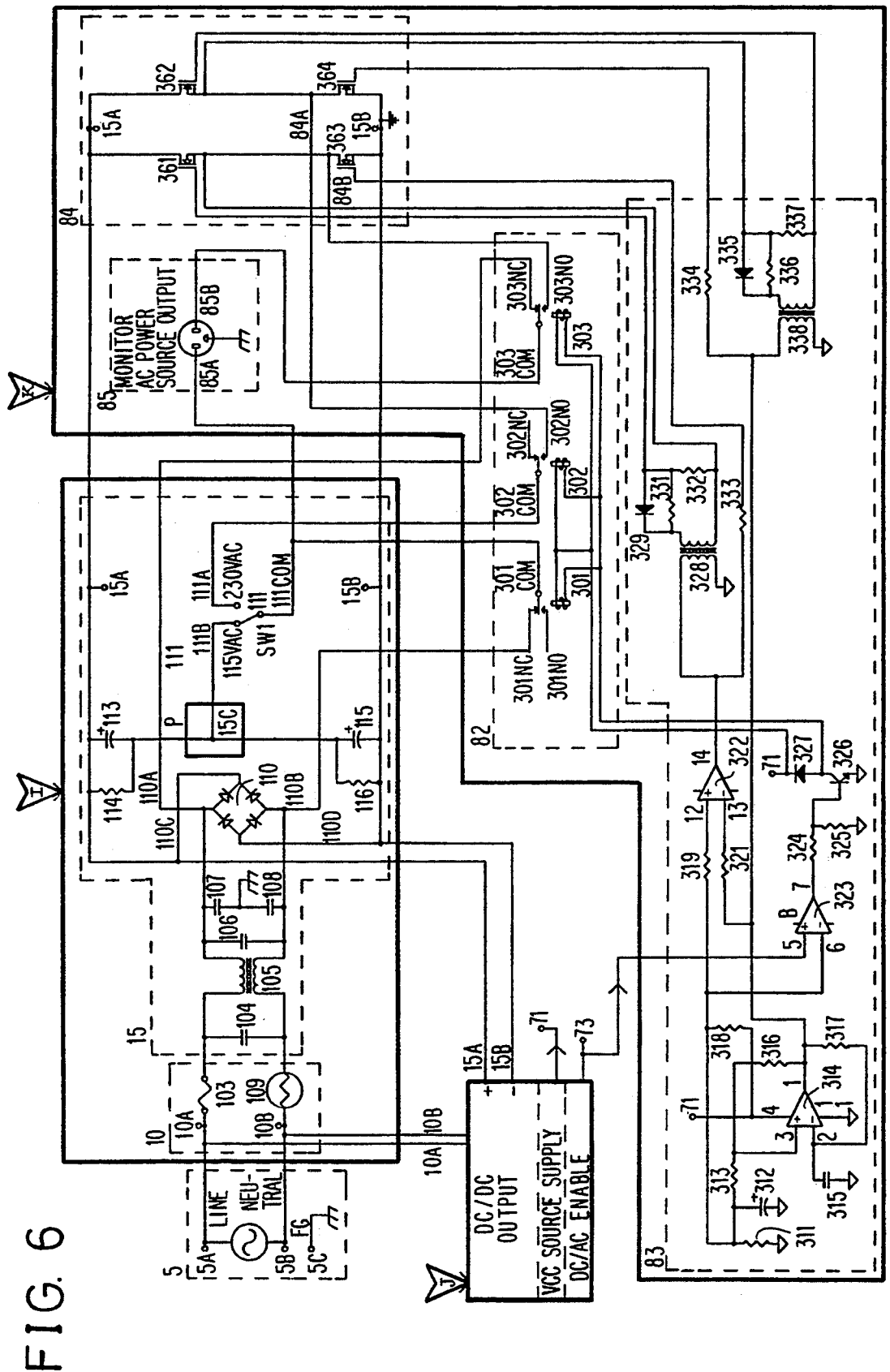
FIG. 6 is a diagram showing the connection among portions "I", "J" and "K" and an embodied circuit diagram of a DC/AC inverter.

FIG. 6 is an embodied circuit diagram of the portion "K", i.e., a DC/AC inverter of the system of the invention. In practice, this portion includes the fourth device 83, the fifth device 82 and the sixth device 84 of the system of the invention. In addition, it also includes the portion "I" connected to a DC/AC inverter, the portion "J" and the connection cable to the AC source 85, wherein:

the fifth device 82 consists of an isolation utility power relay 301, a full/half bridge select relay 302 and an utility power/backup power select relay 303;

the fourth device 83 composes of divided voltage circuits resistors 318, 311, a capacitor 312, operation amplifiers 314, 322, 323; the oscillation circuit composed of an operation amplifier 314, resistors 313, 316, 317 and a capacitor 315 determine the frequency of back-up AC output from the DC/AC inverter;

By using resistors 319, 321 to limit the current and using operation amplifier 322 as an inverting amplifier, it may control the switching time between two half bridges of the bridge converter. A drive circuit composed of resistors 331, 332, 333, a diode 329 and a transformer 328 may drive half bridge power transistors 361, 363, respectively. Another drive circuit composed of resistors 334, 336, 337, a diode 335 and a transformer 338 may be used to drive another set of half bridge power transistors 362, 364.

A signal transmitted from node 73 of the portion "J" is received by an operation amplifier 323, followed by limiting current with resistors 324, 325, and then amplified by a transistor 326 to drive relays 301, 302, 303. A diode 327 is for protecting a transistor 326 and absorbing spike voltage generated by a relay module 82 at a switch transition time.

The power source of a DC/AC type inverter 84 is a full voltage came from serial filtering capacitors 113, 115 and then constructed by power transistors 361, 362, 363 and 364. While the utility power is normal, the external AC load, e.g. computer monitor is supplied from the utility power. While the utility power fails, a relay module 82 switches to supply from a backup power source so as to continue supply electric source for the monitor display.

Figure 7:
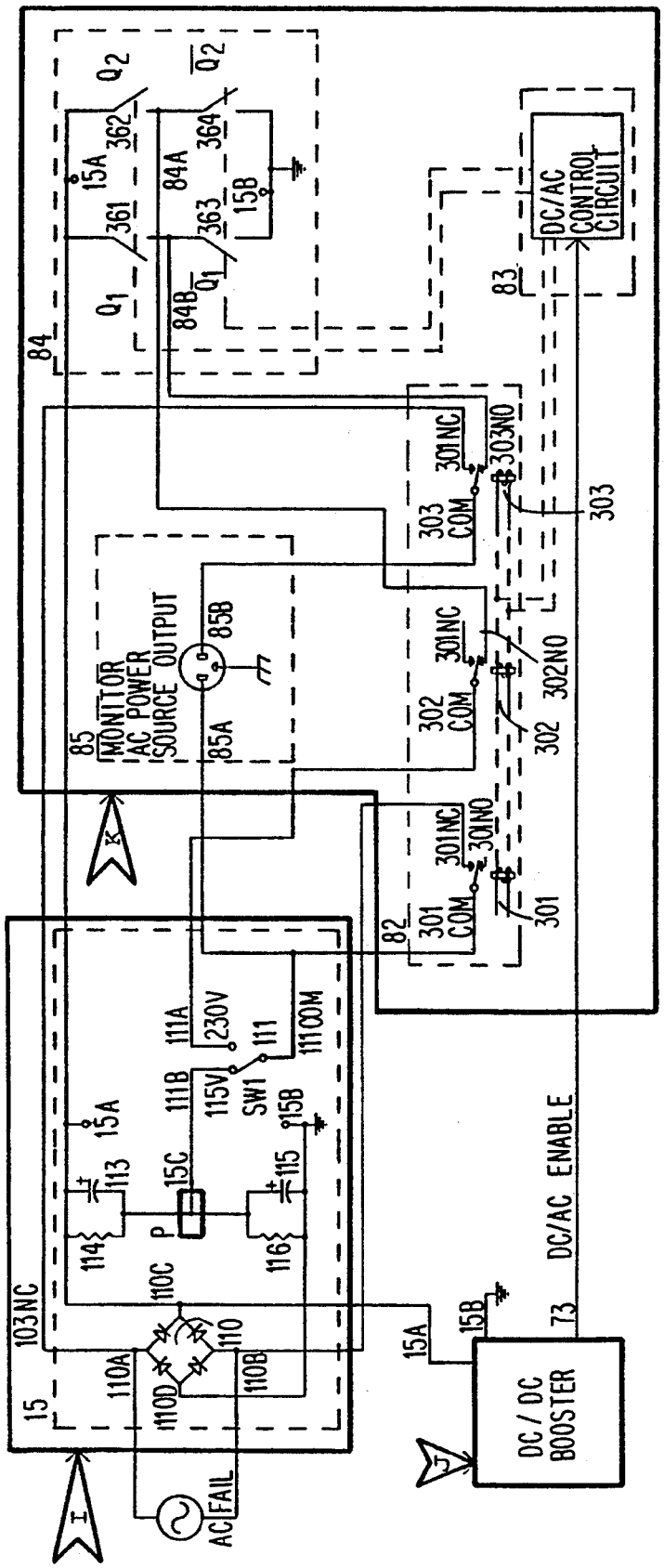
FIG. 7 is an action circuit diagram (half bridge circuit structure) showing application of the system of the invention after the 115 V utility AC power failure (SW1 is set at 115 V output position.)

With reference to FIG. 7, an action circuit diagram shows the condition on utility power 115 V failure. While utility power fails, it is detected by the portion "J" and then immediately starts the DC/DC booster converter in portion "J" to output a DC high voltage via power bus 15A, 15B to the serial filtering capacitors 113, 115 and continue to supply a DC source for the power supply. At the same time, it starts, via a signal 73, a DC/AC inverter 83 control circuit in the portion "K" to convert and output a 115 V AC backup source for a computer monitor.

At this time, because a selecting switch 111 is connected to a position 15C (i.e., node P), the half voltage mid-point, the node P, of serial filtering capacitors 113, 115 is connected and communicated with a selecting switch 111COM. Furthermore, upon 115 V utility power failure, a relay port 82 changes the original connection between the terminal COM and the terminal NC, to a connection between the terminal COM and the terminal NO (It can be clearly seen by comparing FIG. 7 with FIG. 6), whereby allows a DC high voltage output from the portion "J", via power bus 15A and 15B, be filtered by serial filtering capacitors 113, 115, and then sent to a bridge DC/AC inverter 84. In order to supply a 115 V AC output voltage, a half voltage node P of serial filtering capacitors 113, 115 serves to be a relative ground voltage node. It is apparently from the said figure that the terminal 301COM of an isolation utility power relay 301 is switched off from the terminal 301NC and the output terminal 85A of the outlet is isolated from utility power. Then, the terminal 301COM connects to the terminal 111COM of a selecting switch 111, via the terminal 111B, to the node P to serve as a relative ground voltage node.

Alternatively, a full/half bridge select relay 302 switches to form a connection between the terminal 302COM and the terminal 302NO. Besides, the terminal 302COM connects to the 230 V AC position of the 111A node of the selecting switch 111. However, owing to the selecting switch 111 is switched on 115 V AC, the half bridge mode power generated by 84A is unable to be output.

Moreover, the terminal 303COM of a an utility power select/backup power relay 303 is connected to the terminal 85B of the outlet 85, and also connected to the terminal 303NO, and then to the terminal 84B of a DC/AC inverter 84. The converted AC backup power source output from a half bridge mode converter composed in combination of transistors 361 and 363 may also be sent to the terminal 85B of the outlet 85 via the afore-mentioned path.

Figure 7C:
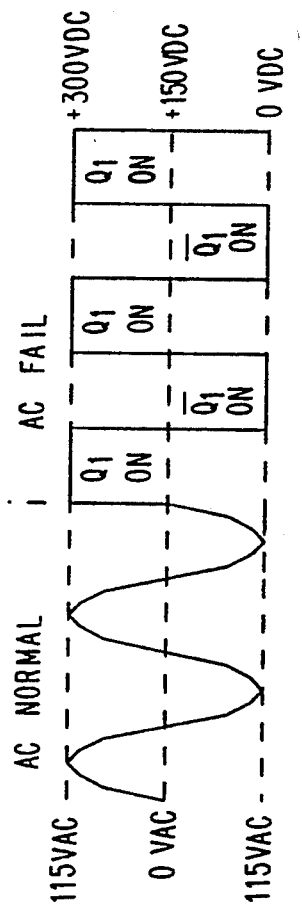
FIG. 7C is an exemplary waveform of FIG. 7A and FIG. 7B of the system of the invention, before and after utility AC power failure.
Figure 7A:
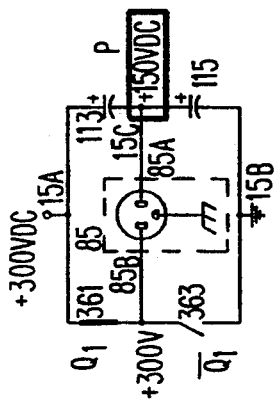
FIGS. 7A and 7B are schematic diagrams of a positive and a negative cycle, respectively, showing application of the system of the invention after the 115 V utility AC power failure.
Figure 7B:
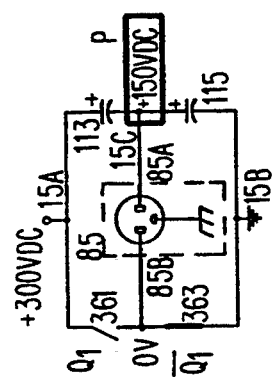

Referring to FIGS. 7A, 7B and 7C, wherein FIG. 7A shows that a relative voltage of the terminal 85B versus 85A of outlet 85 being 300 V−150 V=+150 V in a positive cycle. FIG. 7B shows that a relative voltage of the terminal 85B versus 85A being 0V−150 V=−150 V in a negative cycle. FIG. 7C apparently depicts an AC voltage output waveform of outlet 85. Said waveform is produced by taking a half voltage mid-point, node p, between the serial filtering capacitors 113 and 115 as a relative ground voltage point.

Figure 8:
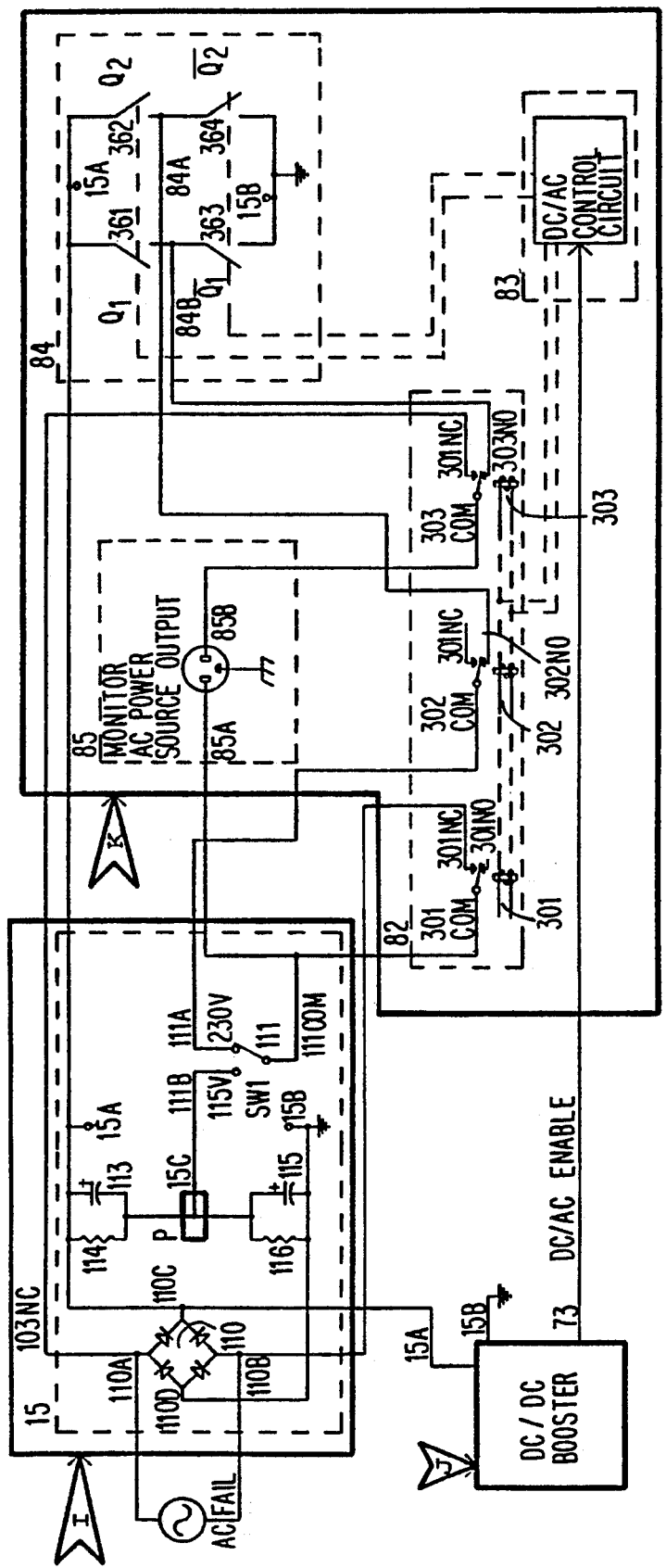
FIG. 8 is an action circuit diagram (full bridge circuit structure showing application of the system of the invention after 230 V utility AC power failure. (SW1 is a set at 235 V output position.).

As shown in FIG. 8 when a 230 V AC utility power fails, the portion "J" detects a failure signal, then it starts a DC/DC booster converter in the portion "J" immediately. A battery power is converted to a DC high voltage, then is connected to the filtering serial capacitors 113, 115 via power bus 15A, 15B, and continues to supply for a power supply. Said action circuit also starts, via a signal cable 73, a control circuit of the DC/AC inverter 83 in the portion "K" in order to convert and output a 230 V AC power source for outlet 85.

In the meanwhile, since the terminal 111COM of the selecting switch 111 is set on the node 111A position of 230 V AC, the serial filtering capacitors 113 and 115 should be applied to a full voltage of 300 V DC. Furthermore, when the utility power of 230 V fails, the connect node of a relay port 82 changes the connection between the terminal NC and the terminal COM to a connection between the terminal NO and the terminal COM (It can be clearly seen by comparing FIG. 8 with FIG. 6).

When switching on is executed by a relay port 82, a DC high voltage supplied from the portion "J" is transmitted, via power bus 15A and 15B, to the serial filtering capacitors 113, 115 and be filtered therein, and then to a bridge DC/AC inverter 84 in order to operate the overall circuit in a manner of a full bridge convertion thereby supply a 230 V AC output.

After the terminal 301COM of an isolation utility power relay 301 switched off the terminal 301NC, it is connected to a terminal 85A of outlet 85, and further since node 111A of a selecting switch 111 is also connected to the terminal 302COM of a full/half bridge select relay 302, and through the terminal 302COM of a relay 302 switches, the terminal 302NO, to the terminal 84A of DC/AC inverter 84, power source being converted and output from the terminal 84A may be sent to the terminal 85A of outlet 85 via this path.

In addition, an utility power/backup power select relay 303 is connected, so that the terminal 85B of outlet 85 can connect to the terminal 84B of DC/AC inverter 84, via the terminal 303COM, to the terminal, Therefore, while the utility power fails, backup power source form the terminal 84B of DC/AC inverter 84 is sent to the terminal 85B of outlet 85, at this time, both 84A and 84B are connected to terminals 85A and 85B outlet 85. As a result, 230 V AC backup power source is output by operation in a full bridge mode for the outlet 85.

Figure 8C:
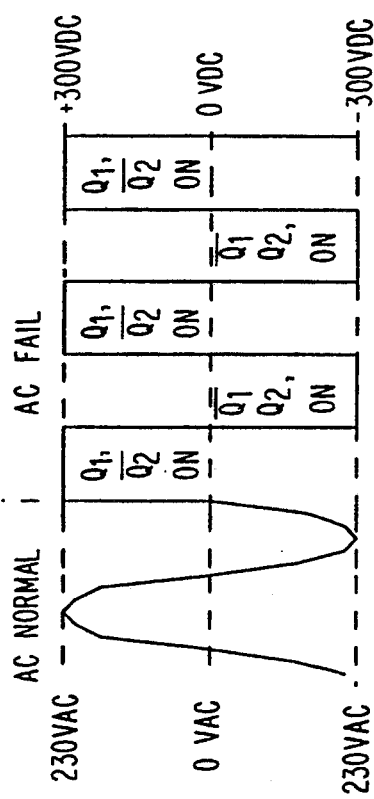
FIG. 8C is an exemplary waveform of FIGS. 8A and 8B of the system of the invention, before and after the utility power failure.
Figure 8A:
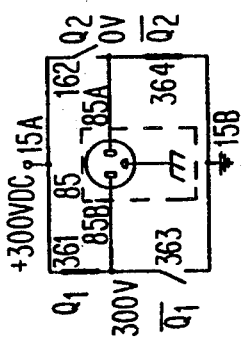
FIGS. 8A and 8B are schematic diagrams of a positive and a negative cycle, respectively, showing application of the system of the invention after 230 V utility AC power failure.
Figure 8B:
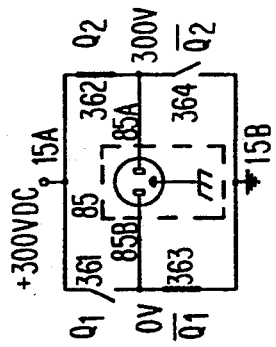

With reference to FIGS. 8A, 8B and 8C, wherein operating in a full bridge mode manner, as shown in FIG. 8A a relative voltage of the terminal 85B versus 85A of a display outlet 85 is 300 V−0 V=+300 V in a positive cycle; as shown in FIG. 8B a relative voltage of the terminal 85B versus 85A is 0 V−300 V=−300 V in a negative cycle; and the waveform of the operation thereof is shown in FIG. 8C.

In view of the besides a DC backup output, an AC output voltage selectable, power saving, uninterruptible power supply according to the present invention initiates a backup power source in emergency upon the utility power failure, whereby to supply for DC load such as computer and AC load such as computer monitor. Additionally, it provides a power supply protection apparatus thereby to prevent the power supply from damage. Most importantly, the uninterruptible power supply of the invention make it possible to provide a selectable 115 V or 230 V AC voltage output, such that it accomodates for the different voltage demands all over the world. These features of the uninterruptible power supply of the invention finds many application fields and totally eliminate the drawbacks of conventional uninterrupted systems.

While a number of embodiments of the present invention are described and exemplified herein, a number of other useful modifications, derivations and extensions of such embodiments are possible which are within the spirit and scope of the present invention, and which are intended to be encompassed within the following claims.

I claim:

1. An uninterruptible power supply featuring selectable AC output voltages and power savings comprising:
    a source of interruptible utility-supplied AC power;
    a first device comprising the series combination of, respectively, a noise filter connected to said utility-supplied AC power, a bridge rectifier and filtering capacitors connected to a DC voltage bus, together with a 115 V/230 V selecting switch in which the 115 V/230 V selecting switch serves two purposes, namely, (1) when AC utility power is available, the switch selects different input voltage ranges for utility-supplied AC power, and (2) when AC utility power is not available, the switch sets different backup AC output voltage ranges according to the input voltage range;
    a second device comprising a DC/DC booster converter and a battery, wherein the DC/DC booster converter converts battery power to a 300 V DC power, charges the battery and detects utility power failure and the output thereof connects to said DC voltage bus;
    a third device comprising a DC/DC step-down converter for converting a high voltage DC to a low voltage DC, a regulation control and regulated DC outputs, in which the DC/DC step-down converter connects to said DC voltage bus and serves as a drive circuit and an isolation circuit for the regulated DC outputs; the regulation control connected to the low voltage DC output and the DC/DC step-down converter comprising a PWM (pulse width modulation) controller and an over voltage protection circuit which regulate the output of the DC/DC step-down converter;
    a fourth device comprising a DC/AC inverter control circuit connected to said second device by a DC/AC inverter enable line which enables or disables the DC/AC inverter;
    a fifth device comprising a relay port which comprises an isolation utility power relay, a full/half bridge select relay and a utility power/backup power select relay which is connected to the first device, the fourth device and the sixth device, respectively, to decide whether 115 VAC, or 230 VAC will be functioning on an AC outlet; and
    a sixth device comprising a DC/AC inverter supplied with DC power from the second device which supplies AC power under control of the fourth device to the fifth device for supplying AC power to an outlet when the utility-supplied AC power fails;
    whereby when the utility power is normal, a DC regulated voltage is supplied for the load from the third device; and when the utility-supplied AC power fails, a backup battery power is boosted to a DC high voltage by the second device and sent to the first device from which DC voltage continues to be provided to the third device for output to the DC load; and also, by means of the fourth, fifth and sixth devices and by setting the selecting switch in the first device, a back up source of AC power is supplied for external AC loads.

2. An uninterruptible power supply as claimed in claim 1, wherein, when said selecting switch is set at a backup AC 115 V output by means of the switching of the relay port in the fifth device, the sixth device will function as a half bridge circuit upon power failure and use a relative ground voltage point at the junction of serially connected filtering capacitors, to provide an AC 115 V output; and when the selecting switch is set at a backup AC 230 V output, by means of the switching of the relay port in the fifth device, the sixth device will function as a full bridge circuit upon power failure and use the overall voltage across the serial filtering capacitors to provide an AC 230 V output.

3. An uninterruptible power supply as claimed in claim 1, wherein, the power source of the control circuits in the second and fourth devices are interlocked and controlled by the third device for the purpose of power saving; and said power saving circuit consists of at least a relay.

* * * * *